Patented June 15, 1937

2,083,691

UNITED STATES PATENT OFFICE 2,083,691

METHOD OF PRODUCING ALKALI METAL PEROXIDE

George Lewis Cunningham, Niagara Falls, N. Y., assignor to The Mathieson Alkali Works, Inc., New York, N. Y., a corporation of Virginia No Drawing. Application September 29, 1936 Serial No. 103,103

6 Claims. (Cl. 23—184)

This invention relates to the production of anhydrous sodium peroxide, $Na_2O_2$. The invention provides a process for manufacturing anhydrous sodium peroxide producing a product of high purity with good economy, with respect both to material costs and operating costs.

The generally practiced processes for the production of sodium peroxide all involve the use of metallic sodium and the use of rather high temperatures, and consequently involve high costs in both of these respects. The process of this invention, however, makes the use of high temperatures unnecessary and, instead of requiring metallic sodium, is applicable to the sodium amalgam produced in conventional mercury cathode electrolytic cells.

Manchot & Herzog have hitherto described the production of sodium peroxide by reaction between oxygen and a methyl alcohol solution of hydrazo benzene and sodium methylate (Annalen, 1901, 316, 331). The sodium peroxide thus produced, however, is recovered, not as anhydrous sodium peroxide, but as a hydrate of sodium hydrogen peroxide, NaOOH, as sodium hydrogen peroxide monohydrate, $NaOOH.H_2O$, for example. This is due to the fact that sodium peroxide reacts with methyl alcohol about as follows:

I have discovered that this reaction between sodium peroxide and methyl alcohol, for example, to produce sodium methylate and sodium hydrogen peroxide can be suppressed by effecting the oxidation of the hydrazo compound in an anhydrous benzene solution of the alcoholate and by so limiting the concentration of alcohol present as such and as alcoholate that the molar ratio of alcohol to the hydrazo benzene does not exceed about 2:1 and that the molar ratio of benzene to alcohol is not less than about 10:1. I am thus able to adapt this known oxidation of hydrazo benzene to the direct production of anhydrous sodium peroxide.

According to this invention, an appropriate hydrazo compound is oxidized, by blowing with oxygen or air or other appropriate oxygen-containing gas for example, in the presence of sodium methylate, for example, in an anhydrous mixture of benzene and methyl alcohol to form the corresponding azo compound and to precipitate anhydrous sodium peroxide, the molar ratio of benzene to alcohol being not less than about 10:1 or better not less than about 20:1, the molar ratio of alcohol including alcohol present as alcoholate to the hydrazo compound being not more than about 2:1 and the proportion of benzene being sufficient to maintain the hydrazo and azo compounds in solution. The alcohols and alcoholates of the alcohols having not more than 4 carbon atoms are useful in the process of the invention. The oxidation reaction may be typified as follows:

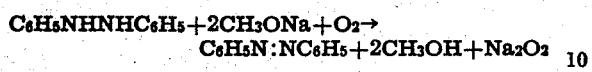

The process is made cyclic by regenerating the hydrazo benzene by reducing the azo benzene resulting from the oxidation with a sodium amalgam, this reaction also producing the sodium alcoholate consumed in the oxidation. This reduction reaction may be typified as follows:

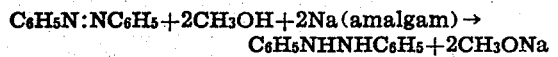

For the complete cylic process, the reaction may thus be typified as follows:

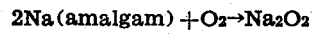

This invention includes two embodiments of the cyclic process, one a two-stage process in which the oxidation of the hydrazo compound and the reduction of the azo compound are effected as separate operations, the anhydrous sodium peroxide being separated between the oxidation and the reduction, and another combining the oxidation and reduction in a single stage.

According to the first of these embodiments of the cyclic process, the oxidation of the hydrazo compound is effected as just described, the precipitated anhydrous sodium peroxide is then separated from the benzene-alcohol mixture, and the azo compound in solution in the anhydrous mixture of benzene and alcohol is then reduced with a sodium amalgam to regenerate the hydrazo compound which is returned to the oxidation.

According to the second of these embodiments of the cyclic process, the hydrazo compound is oxidized in the presence of the sodium alcoholate to form the corresponding azo compound and to form the anhydrous sodium peroxide and in the presence of sodium amalgam to regenerate the hydrazo compound by reducing the azo compound resulting from the oxidation, and to produce additional sodium alcoholate, in an anhydrous mixture of benzene and alcohol, the molar ratio of benzene to alcohol being not less than about 10:1, the molar ratio of alcohol including alcohol present as alcoholate to the hydrazo compound not exceeding about 2:1, and the proportion of benzene being sufficient to maintain the hydrazo and azo compounds in solution, the sodium peroxide formed, and thrown out of solution, being maintained in suspension in the benzene-alcohol mixture, by agitation for example, and separating sodium peroxide from withdrawn portions of the benzene-alcohol mixture, by filtration for example. In this embodiment of the invention, the molar ratio of alcohol including alcohol present as alcoholate to the hydrazo compound is with advantage limited not to exceed about 2:1.

While I have referred specifically to hydrazo benzene, and the corresponding oxidation product azobenzene, as the intermediates by which the anhydrous sodium peroxide is produced, hydrazo benzene and azobenzene typify the intermediates which may be designated hydrazo compounds and azo compounds known to react to produce peroxides in this manner. For example, the intermediates useful in carrying out this invention include hydrazo benzene, the hydrazo toluenes, particularly p-hydrazotoluene, p-ethyl hydrazobenzene, the hydrazo triazols, phenyl hydrazone, anthrahydroquinone, di-hydrophenanthrenechinon, and the amino substituted aromatic hydrazo compounds such as the amino substituted hydrazo benzenes, toluenes, xylenes and naphthalenes, and the corresponding azo compounds.

The following examples will illustrate the practice of the process of the invention:

Example I 182 parts (by weight) of azobenzene are dissolved in 1700 parts of thiophene free benzene and 64 parts of methyl alcohol are added to this solution, the solution is then reduced with a sodium amalgam containing 0.1% (by weight) sodium at a temperature of 25° C., the reduction being continued until 46 parts of sodium has reacted. The azo benzene solution, originally deep red, becomes straw yellow as the reduction reaction is completed. After separation of the resulting hydrazo benzene solution from the discharged amalgam, oxygen is passed into the hydrazo benzene solution until 32 parts are absorbed. 78 parts of anhydrous sodium peroxide is precipitated and separated from the benzene-alcohol mixture by filtration. The remaining azobenzene solution, again deep red, is again reduced with sodium amalgam, the process being repeated as described.

Example II 210 parts of p-azotoluene are dissolved in 4000 parts of thiophene free benzene and 92 parts of ethyl alcohol are added to this solution. This p-azotoluene solution, originally deep red, is reduced with sodium amalgam containing 0.3% sodium, 25–50° C., the reduction being continued until 46 parts of sodium have reacted. The resulting hydrazo toluene solution, then straw yellow, is separated from the discharged amalgam and air is passed into the separated hydrazo toluene solution until 32 parts of oxygen are absorbed. 72 parts of anhydrous sodium peroxide are precipitated. This precipitated anhydrous sodium peroxide is separated from the benzene-alcohol mixture by filtration. The remaining azotoluene solution, again deep red, is reduced with sodium amalgam in a repetition of the process.

The sodium peroxide produced may be marketed as such or it may be converted, in any convenient manner, to hydrogen peroxide, sodium perborate, sodium percarbonate, calcium peroxide, magnesium peroxide or similar compounds.

While the invention has been described with particular reference to the production of anhydrous sodium peroxide, it is also useful for the production of anhydrous peroxides of potassium and the other alkali metals. For the production of anhydrous alkali metal peroxides, the alkali metal alcoholate or the alkali metal amalgam may be used generally as the sodium alcoholate and sodium amalgam more particularly described.

While the equations above set forth as typifying reactions involved in the invention are generally descriptive of these reactions, it appears that the proportion of alcohol required for complete reaction of the intermediate, more particularly in the first described embodiment of the cyclic process, may be less than that theoretically indicated to be required by these equations. It may be, for example, that the total reaction may include reactions such as the following:

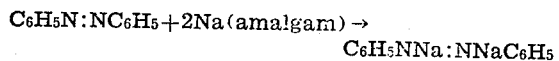
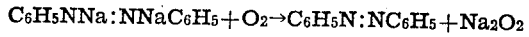

In any event, the efficiency of the process does not appear to be directly dependent upon the use of maximum proportions of alcohol within the limits previously specified.

I claim:

1. In the production of anhydrous alkali metal peroxides, the improvement which comprises oxidizing an hydrazo compound in the presence of an alcoholate of the alkali metal and of an alcohol having less than four carbon atoms in an anhydrous mixture of benzene and the same alcohol to form the corresponding azo compound and to precipitate the anhydrous peroxide, the molar ratio of benzene to alcohol being not less than about 10:1, the molar ratio of alcohol including alcohol present as alcoholate to the hydrazo compound being not more than about 2:1, and the proportion of benzene being sufficient to maintain the hydrazo and azo compounds in solution.

2. In the production of anhydrous alkali metal peroxides, the improvement which comprises oxidizing an hydrazo compound in the presence of an alcoholate of the alkali metal and of an alcohol having less than four carbon atoms in an anhydrous mixture of benzene and the same alcohol to form the corresponding azo compound and to precipitate the anhydrous peroxide, the molar ratio of benzene to alcohol being not less than about 10:1, the molar ratio of alcohol including alcohol present as alcoholate to the hydrazo compound being not more than about 2:1, and the proportion of benzene being sufficient to maintain the hydrazo and azo compounds in solution, separating the precipitated anhydrous alkali metal peroxide, reducing the resulting azo compound in the anhydrous mixture of benzene and alcohol with an amalgam of the alkali metal to form the corresponding hydrazo compound, and supplying the thus regenerated hydrazo compound to the first mentioned oxidation.

3. In the production of anhydrous alkali metal peroxides, the improvement which comprises oxidizing an hydrazo compound in the presence of an alcoholate of the alkali metal and of an alcohol having less than four carbon atoms in an anhydrous mixture of benzene and the same alcohol to form the corresponding azo compound and to precipitate the anhydrous peroxide, the molar ratio of benzene to alcohol being not less than about 20:1, the molar ratio of alcohol including alcohol present as alcoholate to the hydrazo compound being not more than about 2:1, and the proportion of benzene being sufficient to maintain the hydrazo and azo compounds in solution.

4. In the production of anhydrous alkali metal peroxides, the improvement which comprises oxidizing an hydrazo compound in the presence of an alcoholate of the alkali metal and of an alcohol having less than four carbon atoms in an anhydrous mixture of benzene and the same alcohol to form the corresponding azo compound and to precipitate the anhydrous peroxide, the molar ratio of benzene to alcohol being not less than about 20:1, the molar ratio of alcohol including alcohol present as alcoholate to the hydrazo compound being not more than about 2:1, and the proportion of benzene being sufficient to maintain the hydrazo and azo compounds in solution, separating the precipitated anhydrous alkali metal peroxide, reducing the resulting azo compound in the anhydrous mixture of benzene and alcohol with an amalgam of the alkali metal to form the corresponding hydrazo compound, and supplying the thus regenerated hydrazo compound to the first mentioned oxidation.

5. In the production of anhydrous alkali metal peroxides, the improvement which comprises oxidizing an hydrazo compound in the presence of an alcoholate of the alkali metal and of an alcohol having less than four carbon atoms in an anhydrous mixture of benzene and the same alcohol to form the corresponding azo compound and to form the anhydrous peroxide, the molar ratio of benzene to alcohol being not less than about 10:1, the molar ratio of alcohol including alcohol present as alcoholate to the hydrazo compound being not more than about 2:1, and the proportion of benzene being sufficient to maintain the hydrazo and azo compounds in solution, and in the presence of an amalgam of the alkali metal to regenerate the hydrazo compound by reducing the azo compound resulting from the oxidation, maintaining the alkali metal peroxide in suspension in the benzene-alcohol mixture, and separating alkali metal peroxide from withdrawn portions of the benzene-alcohol mixture.

6. In the production of anhydrous alkali metal peroxides, the improvement which comprises oxidizing an hydrazo compound in the presence of an alcoholate of the alkali metal and of an alcohol having less than four carbon atoms in an anhydrous mixture of benzene and the same alcohol to form the corresponding azo compound and to form the anhydrous peroxide, the molar ratio of benzene to alcohol being not less than about 10:1, the molar ratio of alcohol including alcohol present as alcoholate to the hydrazo compound being not more than about 1:2, and the proportion of benzene being sufficient to maintain the hydrazo and azo compounds in solution, and in the presence of an amalgam of the alkali-metal to regenerate the hydrazo compound by reducing the azo compound resulting from the oxidation, maintaining the alkali metal peroxide in suspension in the benzene-alcohol mixture, and separating alkali metal peroxide from withdrawn portions of the benzene-alcohol mixture.

GEORGE LEWIS CUNNINGHAM.